(12) United States Patent
Miyamoto (10) Patent No.: US 6,975,356 B1
(45) Date of Patent: Dec. 13, 2005

(54) SOLID-STATE IMAGING DEVICE WITH THE ELIMINATION OF THERMAL NOISE

(75) Inventor: Yoshihiro Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 765 days.

(21) Appl. No.: 09/604,072

(22) Filed: Jun. 26, 2000

(30) Foreign Application Priority Data

| Jun. 28, 1999 | (JP) | ................................. 11-182589 |
| May 29, 2000 | (JP) | ............................. 2000-158023 |

(51) Int. Cl.⁷ .......................................... H04N 5/335
(52) U.S. Cl. ..................................... 348/308; 348/300
(58) Field of Search ................................ 348/302, 308, 348/241; 257/222, 233, 290, 291, 292; 250/208.1

(56) References Cited

U.S. PATENT DOCUMENTS

| 5,512,750 | A | * | 4/1996 | Yanka et al. ............. 250/338.4 |
| 5,665,959 | A | * | 9/1997 | Fossum et al. ........... 250/208.1 |
| 5,900,623 | A | * | 5/1999 | Tsang et al. .............. 250/208.1 |
| 6,369,853 | B1 | * | 4/2002 | Merrill et al. ............... 348/302 |
| 6,512,544 | B1 | * | 1/2003 | Merrill et al. .............. 348/302 |
| 6,636,261 | B1 | * | 10/2003 | Pritchard et al. ........... 348/308 |

FOREIGN PATENT DOCUMENTS

JP          8-205034        8/1996

OTHER PUBLICATIONS

Nishida Yasuaki, et al."Noise in a CCD Image Sensor and the New Low-Nosie Read-Out Method", Journal of the Institute of Television Engineers of Japan, vol. 39, No. 12, p. 11176-1181, 1985.
Eric R. Fossum, "CMOS Image Sensors: Electronic Camera on a Chip", IEDM 95, pp. 17-25.

* cited by examiner

Primary Examiner—Tuan Ho
(74) Attorney, Agent, or Firm—Westerman, Hattori, Daniels & Adrian, LLP (57) ABSTRACT

A solid-state imaging device comprises: a plurality of pixels including a light-sensitive portion (2) for photoelectrically converting incident light, a transfer gate (10) for transferring a charge stored in the light-sensitive portion, a resettable detection capacitor (18) for storing the charge transferred from the transfer gate, and a selection switch (26) for outputting a charge of the detection capacitor according to a selection signal RWn; a charge amplifier (41) for converting the detection capacitor charge, which is outputted from the pixels, to a voltage; and a correlated double sampling circuit (86) for obtaining a voltage difference between a reset level and a detected level converted by the charge amplifier. According to the above device, a thermal noise is eliminated due to the correlated double sampling circuit. Further, a fixed pattern noise is not generated due to the pixel circuit structure.

9 Claims, 11 Drawing Sheets

FIG. 4B
Reset Period t1

FIG. 4C
Reset Level
Read out Period t2

FIG. 4D
Light Integral Value
Read out Period t3

SOLID-STATE IMAGING DEVICE WITH THE ELIMINATION OF THERMAL NOISE

BACKGROUND OF THE INVENTION

1. Field of the Invention

The present invention relates to a solid-state imaging device constituted by a semiconductor device, and more particularly to an XY address-type solid-state imaging device manufactured by a CMOS process. In addition, the present invention relates to a solid-state imaging device capable of eliminating the effects of fixed pattern noise and thermal noise.

2. Description of the Related Art

Solid-state imaging devices include XY address-type solid-state imaging devices in which an image sensor is formed by CMOS, and the so-called CCD solid-state imaging devices constituting a charge transfer-type image sensor. Because the XY address-type solid-state imaging device, which utilizes a CMOS image sensor, does not require a special manufacturing process, and is driven by a single power source with smaller power consumption, and furthermore, is capable of mounting various signal processing circuits on the same chip, it is seen as a promising replacement for CCD solid-state imaging devices.

Figure 7:
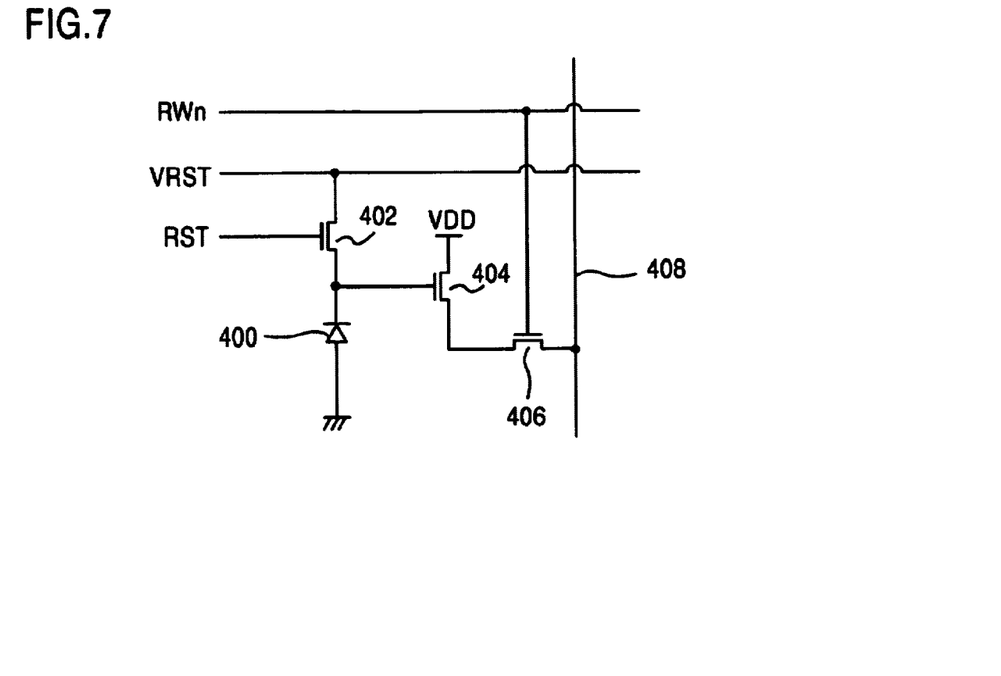
FIG. 7 is a diagram showing a conventional XY address-type solid-state imaging device, which uses a CMOS image sensor.

This CMOS image sensor-equipped conventional XY address-type solid-state imaging device will be explained by using FIG. 7. FIG. 7 shows an example circuit worth of one picture element (pixel) of a conventional XY address-type image sensor. The conventional CMOS image sensor shown in FIG. 7 has a constitution called an APS (Active Pixel Sensor), which mounts a source follower or other such buffer 404 to each pixel. The cathode side of a photodiode 400 is connected to the gate electrode of the buffer 404, and to an MOSFET reset switch 402. Further, buffer 404 is connected to a vertical selection line 408 via a horizontal selection switch 406.

The operation of this conventional XY address-type solid-state imaging device will be briefly explained. First, when reset switch 402 is turned ON at a prescribed timing by a reset signal RST, photodiode 400 is charged to a reset potential VRST. Next, the discharge of photodiode 400 commences in line with an incoming light, and the potential decreases from the reset potential VRST. After the passage of a prescribed time, when a horizontal selection signal RWn is input to the gate electrode of horizontal selection switch 406, and horizontal selection switch 406 transitions ON, a source voltage of buffer 404 is extracted as a signal voltage via vertical selection line 408.

However, a conventional APS of the above constitution has a charge storage capacitor and a source follower or other such amplifier, a fixed pattern noise (FPN) in generated. This noise is DC output level fluctuation for the same signal according to VT (threshold voltage) variation of the source follower transistor. It results in picture quality deterioration. That is, the detection voltage varies between cells for the same quantity of light received, resulting from built-in variations in the threshold voltage VT of the source follower transistor 404.

To reduce this variation, in the conventional device, after sampling an integral level conforming to a quantity of received light as a source signal voltage V1 of buffer 404, photodiode 400 is reset to the reset potential VRST, and this reset voltage is sampled. Then, fixed pattern noise is reduced by determining, using a correlated double sampling (CDS) circuit, the voltage difference between a source signal voltage V2 corresponding to reset voltage VRST and the above-mentioned source signal voltage V1. In other words, by sampling a reset voltage after storing a quantity-of-light signal, and determining, via a correlated double sampling circuit (CDS circuit), the difference with the signal voltage at the time of storing the quantity-of-light signal, the effects of threshold voltage VT variations are removed, and the fixed pattern noise (FPN) is reduced.

However, with this method, there remains the problem that the reset noise (kTC noise) before storing a quantity-of-light signal and the reset noise after reading the signal are added so as to increase the random noise level, and the S/N ratio deteriorates compared to that of a CCD solid-state imaging device.

kTC noise (where k is Boltzmann's constant, T is absolute temperature, and C is the capacitor of photodiode 400) is a kind of thermal noise. When reset switch 402 is made conductive by a reset signal RST, and photodiode 400 charges to a reset voltage VRST, the cathode terminal voltage of this parasitic capacitance is subject to the fluctuations of the thermal noise $4kTR\Delta f$ (where R is the resistance of reset switch 402, and $\Delta f$ is the frequency range at charge time) from the reset voltage VRST. As a result thereof, the cathode terminal voltage resulting from a reset operation is not necessarily becoming a constant reset voltage VRST.

The above-mentioned conventional example uses the difference between a quantity-of-light signal level whose voltage drops from an initial reset level conforming to a quantity of received light, and a reset level of immediately thereafter. However, since this kTC noise has random fluctuations with time as hereinabove, the kTC noise that is superimposed on the initial reset level differs from the kTC noise that is superimposed on the second reset level, making it impossible to curb kTC noise even by using the difference between these two levels to curb fixed pattern noise (variations in threshold voltage VT).

Figure 8:
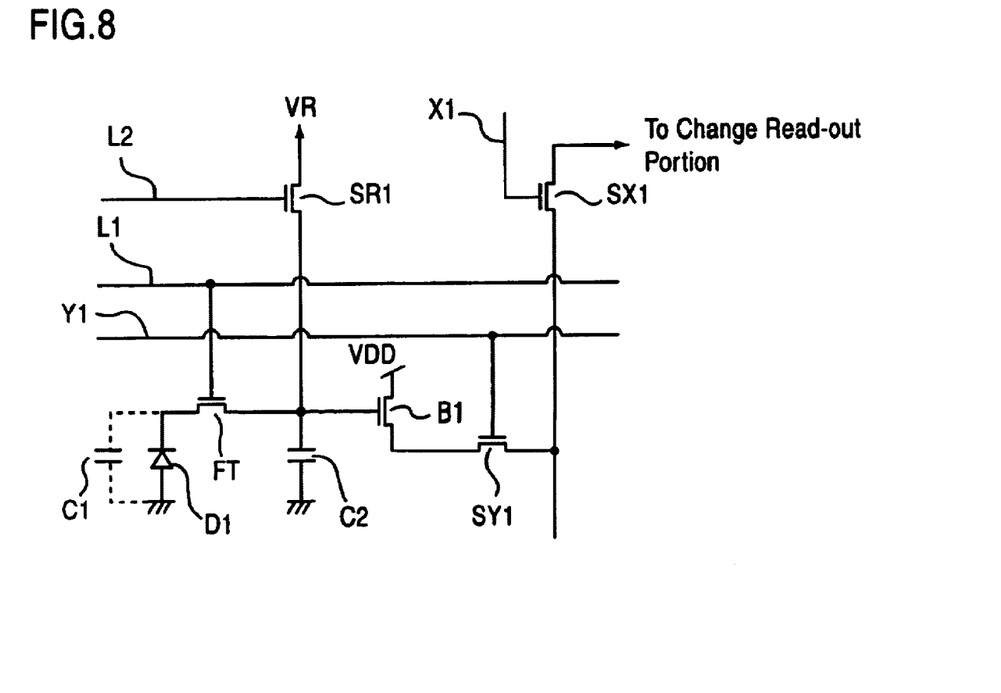
FIG. 8 is a diagram showing another example of a conventional XY address-type solid-state imaging device, which uses a CMOS image sensor.

Next, an XY address-type solid-state imaging device disclosed in Japanese Patent Application Laid-open No. 8-205034 will be explained by using FIG. 8. In FIG. 8, a source follower-type buffer B1 is connected between a frame transfer gate FT and an MOS-type switch SY1. Further, an MOSFET-constituted reset switch SR1 is connected to a second capacitor C2 for removing a charge that is stored in the second capacitor C2. The drain electrode of a buffer B1 is connected to a power source VDD, and the source electrode of the buffer B1 is connected to a horizontal selection switch SY1. Further, the gate electrode of buffer B1 is connected to second capacitor C2. Reset potential VR is applied to the drain electrode of reset switch SR1. The source electrode of reset switch SR1 is connected to the second capacitor C2, and the gate electrode of reset switch SR1 is connected to reset control signal line L2.

When a charge is transferred to the second capacitor C2 by making frame transfer gate FT conductive after a charge has been stored in a first capacitor C1, the gate potential of the buffer B1 steadily increases. When horizontal selection switch SY1 transitions ON after the passage of a prescribed time, the source voltage of buffer B1 is output via a vertical selection line, and a quantity of charge Q stored in the second capacitor C2 can be detected. By making reset switch SR1 conductive one time prior to making the frame transfer gate FT conductive, all of the charge stored in the second capacitor C2 can be removed, making it possible to curb the deterioration of picture quality resulting from a residual image charge.

However, for the conventional example of FIG. 8, firstly, the problem is that because there is a buffer B1, which is a source follower, it is not possible to remove the effects of threshold voltage variations (fixed pattern noise) in the transistor B1, and the detection level between cells varies. Furthermore, in Japanese Patent Application Laid-open No. 8-205034, there is no disclosure at all that offers suggestions concerning curbing this fixed pattern noise. And it is also not possible to remove kTC noise, which is thermal noise generated at reset, because after the second capacitor C2 is charged to reset voltage VR, a charge that accords with a quantity of light is transferred via gate FT from the first capacitor C1, a voltage that accords with the quantity of light is lowered from reset voltage VR, and only this voltage is transferred to a charge readout portion.

Further, as for the device constitution of the pixel shown in FIG. 8, the problem is that there is at the least 1 more transistor than the device constitution of the pixel shown in FIG. 7 (2 if reset switch 402 shown in FIG. 7 is added), constitution of the pixel portion is complex, and the numerical aperture of the light reception portion (fill factor) decreases.

SUMMARY OF THE INVENTION

An object of the present invention is to provide a solid-state imaging device, which reduces fixed pattern noise (FPN) and thermal noise.

Furthermore, another object of the present invention is to provide a solid-state imaging device, which has a wide numerical aperture with a simple pixel constitution, and which reduces the above-mentioned noise.

To achieve the above-mentioned objects, a first aspect of the present invention is a solid-state imaging device comprising: a plurality of pixels including a light-sensitive portion for photoelectrically converting incident light, a transfer gate for transferring a stored charge to the light-sensitive portion, a resettable detection capacitor for storing the charge transferred from the transfer gate, and a selection switch for outputting a charge of the detection capacitor according to a selection signal; a charge amplifier for converting the detection capacitor charge, which is output from the pixels, to a voltage; and a correlated double sampling circuit for obtaining a voltage difference between a reset level and a detected level converted by the charge amplifier.

In the above-mentioned solid-state imaging device of the present invention, it is desirable that the charge amplifier be a capacitive feedback-type impedance conversion circuit. Further, the charge amplifier is characterized in that, in accordance with the detection capacitor being connected to the selection line by the selection switch transitioning to ON, the reset level of the detection capacitor is converted to a reset voltage, and next, the charge, which is transferred to the detection capacitor from the light-sensitive portion by the transfer gate transitioning to ON, is converted to a detected voltage. Furthermore, it is desirable for the charge amplifier to be connected to the correlated double sampling circuit via a sample holding circuit.

To achieve the above-mentioned objects, a second aspect of the present invention is a solid-state imaging device comprising: a plurality of pixels, having a light-sensitive portion for photoelectrically converting incident light and storing a charge, a reset gate, connected to the light-sensitive portion, for depleting the light-sensitive portion by becoming conductive in response to a reset signal, and a transfer gate, connected to the light-sensitive portion, for outputting a charge stored in the light-sensitive portion by becoming conductive in response to a selection signal; a charge amplifier, connected to the pixels, for converting the outputted charge to a voltage; and a correlated double sampling circuit for sampling and holding the output voltage of the charge amplifier, and a differential voltage between a reset level, which the charge amplifier outputs when being reset, and a detection level, which the charge amplifier outputs in accordance with a charge outputted from the pixels, is output from the correlated double sampling circuit.

According to the above-mentioned second aspect, it is possible to reduce the effects of thermal noise by making use of a differential voltage between a reset level on which a thermal noise is superimposed, and a detection level added thereto. Further, because a light-sensitive portion is depleted by the conduction of a reset gate, thermal noise is not superimposed on the potential (or voltage) level at reset. Furthermore, since there is no source follower or other such circuit in a pixel, fixed pattern noise is not generated.

DESCRIPTION OF THE PREFERRED EMBODIMENTS

Embodiments of the present invention will be explained hereinbelow by referring to the figures. However, the technical scope of the present invention is not limited to such embodiments.

A solid-state imaging device according to a first embodiment of the present invention will be explained by using FIG. 1 through FIG. 6. First, a simplified constitution of a solid-state imaging device according to the embodiment will be explained using FIG. 1.

Figure 1:
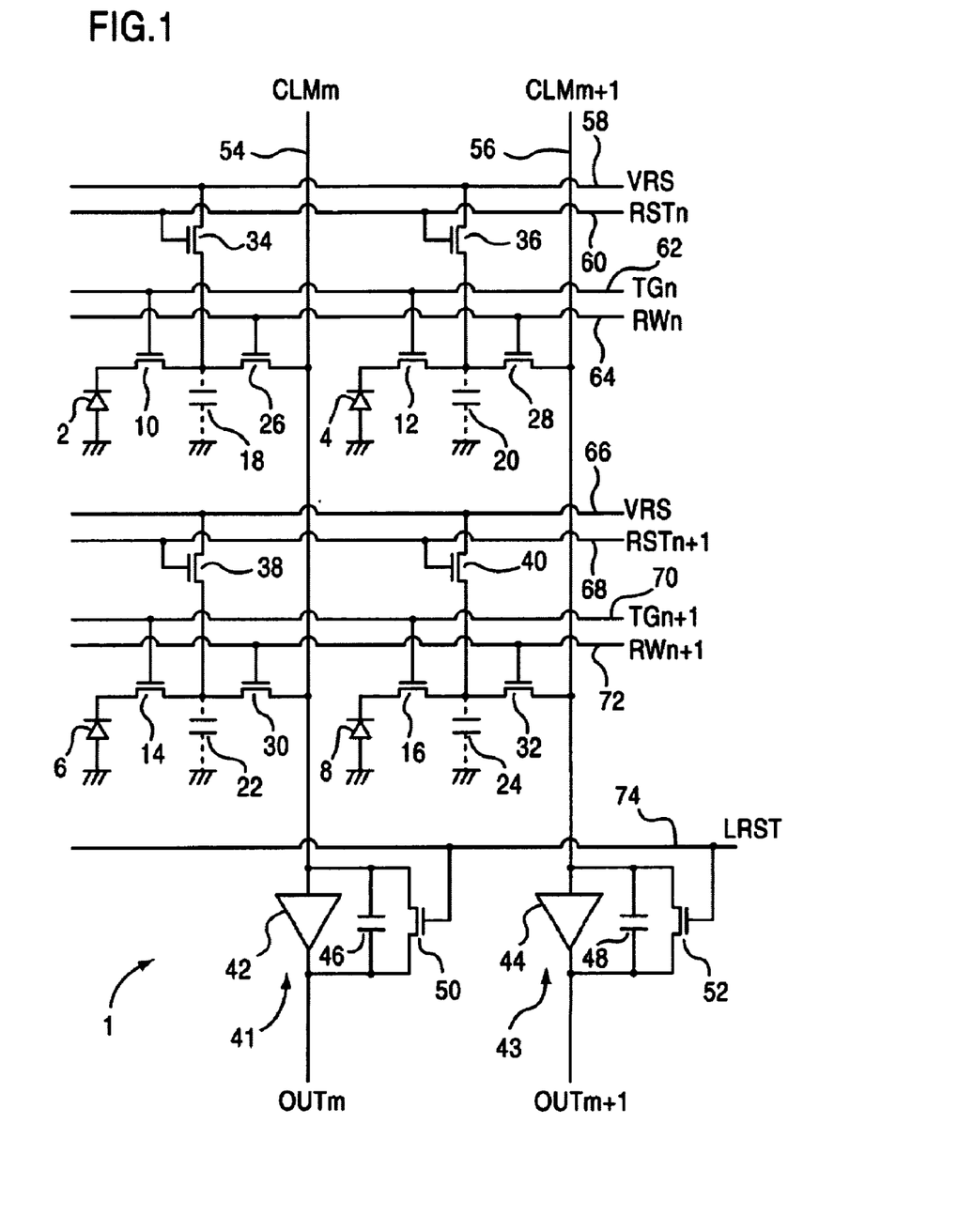
FIG. 1 is a diagram showing a circuit example of an XY address-type image sensor 1 in a solid-state imaging device according to a first embodiment of the present invention.

FIG. 1 shows a circuit example of an XY address-type image sensor 1 corresponding to 2×2 pixels in a solid-state imaging device of the embodiment. MOSFET transfer gates (TG) 10, 12, 14, 16 are connected, respectively, to the cathode sides of photodiodes 2, 4, 6, 8 of the light-sensitive portions of each pixel. Furthermore, photodiode 2 in the light-sensitive portion can be constituted from a photogate. Source junction capacitors of the floating diffusion (FD) region of between transfer gates 10, 12, 14, 16 and MOSFET horizontal selection switches 26, 28, 30, 32 are used as detection capacitors 18, 20, 22, 24. The gate electrodes of transfer gates 10, 12 are connected to transfer gate control line 62, and the gate electrodes of transfer gates 14, 16 are connected to transfer gate control line 70. The gate electrodes of horizontal selection switches 26, 28 are connected to horizontal connection line 64. The gate electrodes of horizontal selection switches 30, 32 are connected to horizontal connection line 72.

Further, MOSFET reset switches 34, 36, 38, 40 for charging detection capacitors 18, 20, 22, 24 to a reset level are connected respectively to the detection capacitors. The drain electrodes of reset switches 34, are connected to reset voltage supply line 58 to which reset voltage VRS is supplied. The source electrodes of reset switches 34, 36 are connected to detection capacitors 18, 20 respectively, and the gate electrodes are connected to reset control signal line 60. The drain electrodes of reset switches 38, 40 are connected to a reset voltage supply line 66 to which reset voltage VRS is supplied. The source electrodes of reset switches 38, 40 are connected to detection capacitors 22, 24 respectively, and the gate electrodes are connected to reset control signal line 68.

Figure 2:
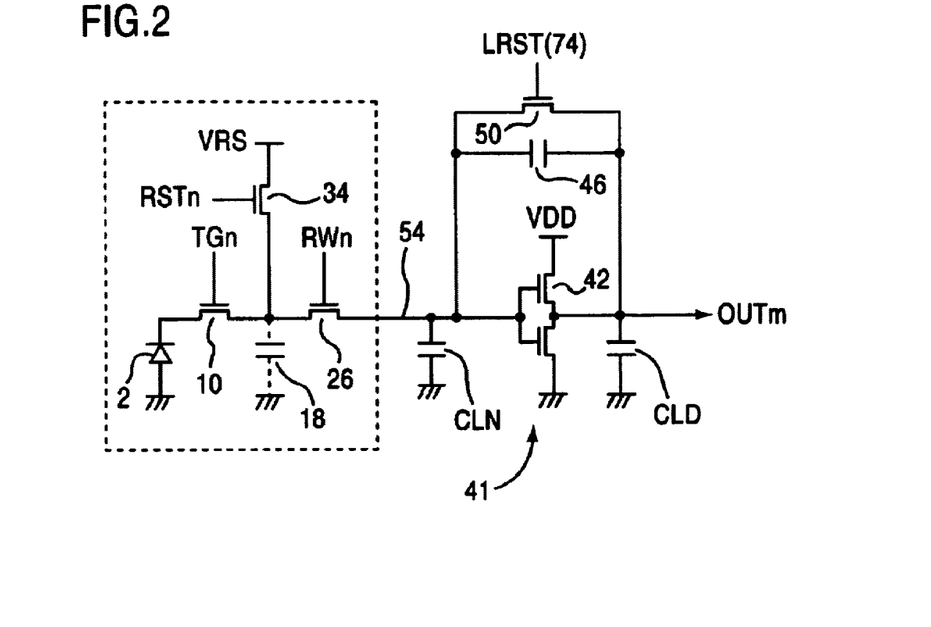
FIG. 2 is a diagram showing a circuit example of a charge amplifier in a solid-state imaging device according to the first embodiment.

Horizontal selection switches 26, 30 are connected to vertical selection line 54, and horizontal selection switches 28, 32 are connected to vertical selection line 56. Charge amplifiers (capacitive feedback-type impedance conversion circuits: CTIA) 41, 43 are connected to vertical selection line 54, 56, respectively. As shown in FIG. 2, for example, charge amplifier 41, which is connected to vertical selection line 54, has a CMOS inverter 42, and feedback capacitor 46, in addition to an MOSFET line reset switch 50 for short circuiting feedback capacitor 46.

In FIG. 2, the block indicated by a broken line in the figure shows the pixel of the upper left of FIG. 1 as an example of the plurality of pixels connected to vertical selection line 54. When detection capacitor 18 is connected to vertical selection line 54 via horizontal selection switch 26, a voltage, which accords with a quantity of charge that is stored in detection capacitor 18, is output as output OUTm by charge amplifier 41, which is connected to vertical selection line 54. Furthermore, capacitors CLN, CLD in the figure indicate the parasitic capacitance of vertical selection line 54 (CLN), and the output terminal capacitance of charge amplifier 41 (CLD). Further, taking the fill factor into consideration, charge amplifier 42 can, of course, utilize a CMOS operational amplifier in place of a CMOS inverter.

Figure 3:
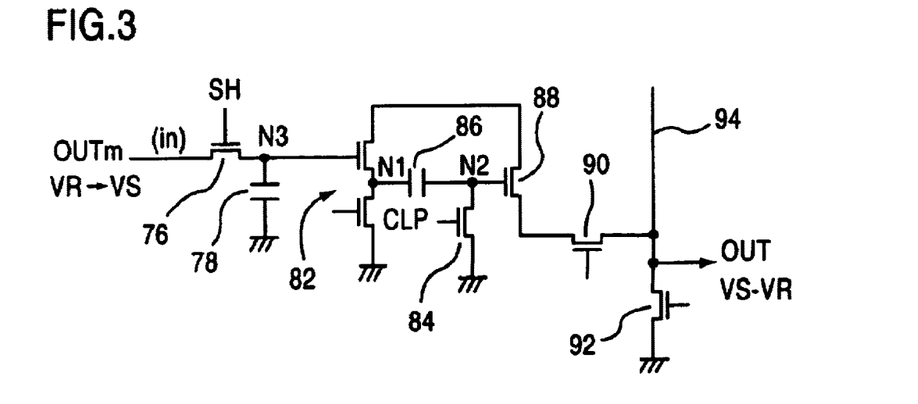
FIG. 3 is a diagram showing a circuit example of a sample holding circuit and a correlated double sampling circuit in a solid-state imaging device according to the first embodiment.

Furthermore, output terminal OUTm is connected to the correlated double sampling circuit shown in FIG. 3, and the differential voltage between a reset level and a detected signal level, which accords with a quantity of light, is detected.

Returning to FIG. 1, similarly, charge amplifier 43, which is connected to vertical selection line 56, has, for example, a CMOS inverter 44, a feedback capacitor 48, and a line reset switch 52 for short circuiting feedback capacitor 48. The gate electrodes of line reset switches 50, 52 are connected to line reset signal line 74, which resets vertical selection lines 54, 56.

As explained hereinabove, in the constitution of an XY address-type image sensor 1 according to the embodiment, a so-called active element (amplifier or the like) does not exist inside each of the pixels, which are provided in a 2-dimensional (of course, 1-dimensional is also fine) layout. More specifically, a source follower-type amplifier, like buffer 404 shown in FIG. 7, or buffer B1 shown in FIG. 8, is not connected between the transfer gates 10, 12, 14, 16 and the horizontal selection switches 26, 28, 30, 32. Taking the pixel in the upper left of FIG. 1 as an example, the main components inside 1 pixel comprise only a light-sensitive portion photodiode 2, a resettable detection capacitor 18, a transfer gate 10 for controlling the transfer of a charge from the light-sensitive portion, a reset switch 34, and a horizontal selection switch 26, which connects the detection capacitor 18 to a vertical selection line 54. A change in the charge of a detection capacitor 18 of a pixel selected from among the plurality of pixels connected to the vertical selection line 54 is detected by the charge amplifier 41, which is connected to vertical selection line 54. In this manner, 1 pixel has a photodiode 2, and 3 transistors (10, 26, 34), making the number of elements the same as the conventional APS shown in FIG. 7, and 1 (or 2) less than the conventional APS shown in FIG. 8. Further, with the constitution of the embodiment, because it is possible to achieve a simple element composition, which uses 3 small, current-driving-capable transistors, there is no need for a source follower driving transistor for driving vertical selection line 54, thus enabling the fill factor to be improved.

Next, specific examples of a sample holding circuit, and a correlated double sampling (CDS) circuit will be briefly explained by using FIG. 3. The circuitry of FIG. 3 is provided to vertical selection lines 54, 56, respectively, of FIG. 1. A sample holding capacitor 78 for holding an inputted output OUTm is connected to an MOSFET sample holding switch 76 for controlling the input of output signal OUTm from charge amplifier 41. Further, a source follower-type buffer 82 is connected to the connection N3 of switch 76 and sample holding capacitor 78. The output N1 of buffer 82 is connected to a CDS capacitor 86 of the correlated double sampling circuit, and the other terminal N2 of CDS capacitor 86 is connected to source follower-type buffer 88. Furthermore, source follower-type buffer 88 is utilized in this sample holding circuit/correlated double sampling circuit, but, of course, these circuits can also be constituted by a voltage follower.

A clamping switch 84 is connected to the connection N2 between CDS capacitor 86 and source follower-type buffer 88. Buffer 88 is connected to a multiplexing switch 90, and multiplexing switch 90 is connected to a common bus interconnect 94. In this manner, the output of the correlated double sampling circuit is connected to common bus interconnect 94 by way of multiplexing switch 90, and is time multiplexed. Further, source follower-type buffer 88 of the correlated double sampling circuit, which is disposed on vertical selection lines 54, 56, respectively, is connected to a common load current source 92 by way of common bus interconnect 94.

Next, the operation of a solid-state imaging device according to the embodiment will be explained using mainly FIG. 4 and FIG. 5, while also referring to FIG. 1 through FIG. 3. FIG. 4 shows the cross-sectional structure and potential schematics of a pixel of an XY address-type image sensor 1 according to the embodiment. FIG. 5 is a timing chart showing the operation of XY address-type image sensor 1.

Figure 4A:
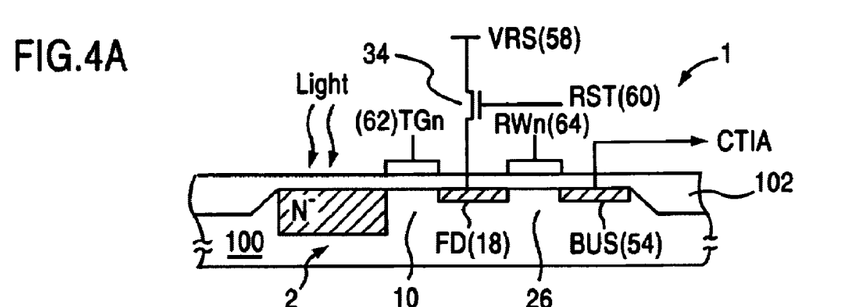
FIGS. 4A–4E are diagrams showing the cross-sectional structure of a pixel and potential schematics of an XY address-type image sensor according to the first embodiment.
Figure 5:
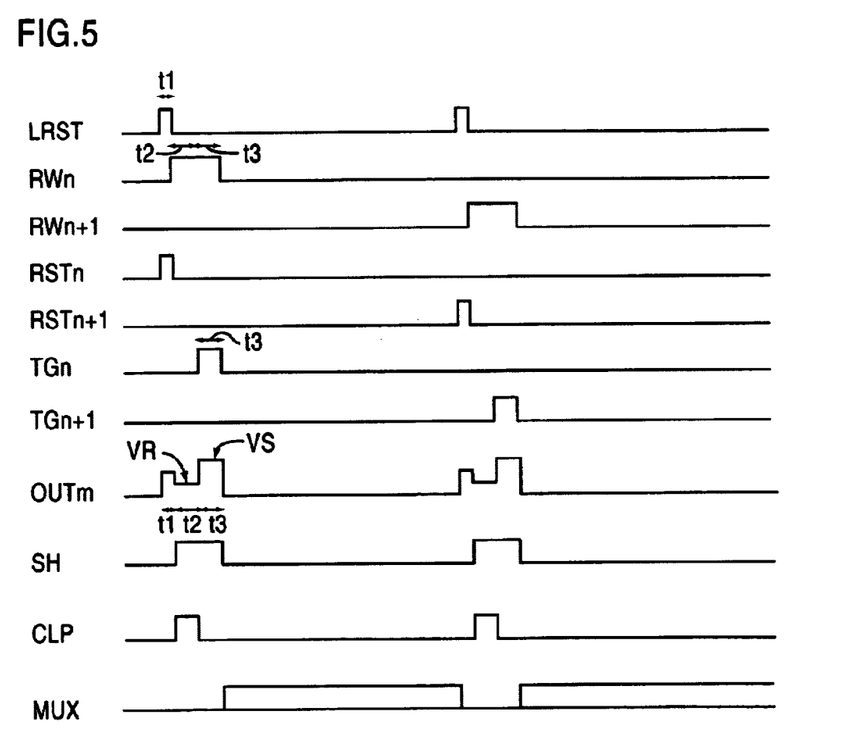
FIG. 5 is a timing chart showing the operation of an XY address-type image sensor according to the first embodiment.

FIG. 4A shows the cross-sectional structure of the pixel in the upper left of FIG. 1, and an N− region constituting a PN junction photodiode 2 is formed inside a P well 100, which is formed inside an N-well region of a P-type substrate not shown in the figure. A dielectric layer 102 (comprising a gate dielectric layer and a field dielectric layer) is formed on the P-well 100. From the perspective of the figure, transfer gate 10 and horizontal selection switch 26 are formed side by side, and reset switch 34 does not appear in this cross-section. The reset switch 34 is the opposite side of the N-region relative to the gate electrode of transfer gate 10, and the region between the gate electrode of the transfer gate 10 and the gate electrode of the horizontal selection switch 26 is an N+ layer floating diffusion (FD) region. The N+ region (BUS), which is formed on the opposite side of the FD region relative to horizontal selection switch 26, is connected to charge amplifier (CTIA) 41 by way of vertical selection line 54.

Figure 4B:
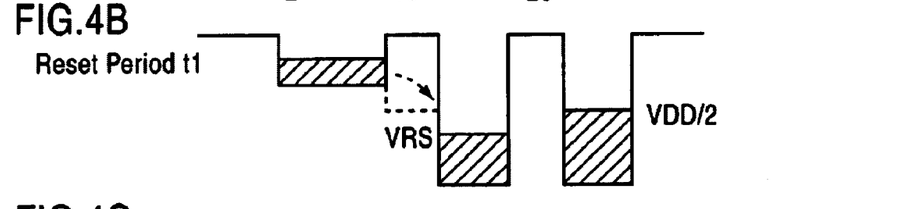
Figure 4C:
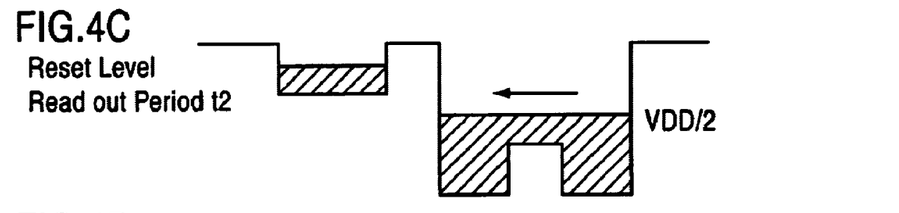
Figure 4D:
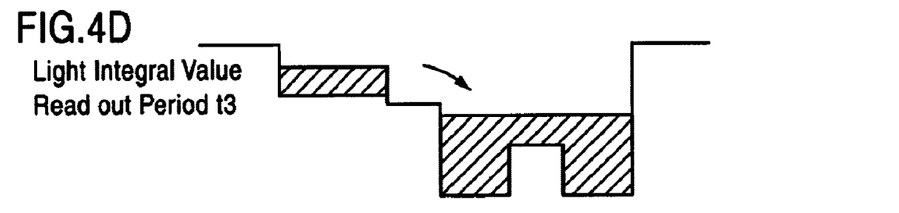
Figure 4E:
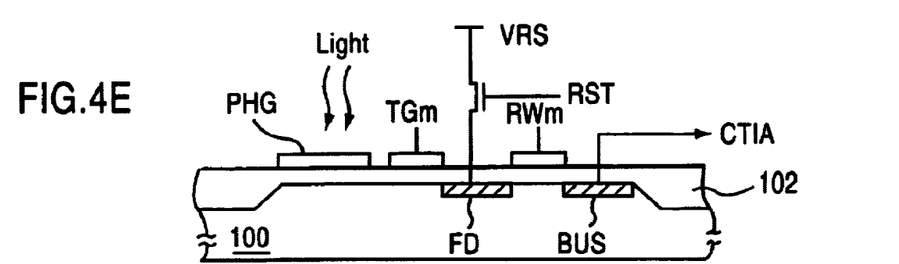

Furthermore, as shown in FIG. 4E, a photogate PHG can, of course, be used in place of photodiode 2 in the light-sensitive portion. The explanation hereinbelow can also be applied in the same manner to an XY address-type image sensor that uses the photogate shown in FIG. 4E. Further, because the photogate itself is known, an explanation of the constitution of FIG. 4E is omitted.

As shown in the timing chart of FIG. 5, a line reset signal LRST is output over line reset signal line 74 at timing t1 (refer to FIG. 4B), and at the same time, a reset signal RSTn (where n is a horizontal selection number) is output over reset control signal line 60. Charge amplifier 41 and vertical selection line 54 are reset by line reset signal LRST, and the FD region (detection capacitor 18) is reset by reset signal RSTn to a reset voltage VRS from reset voltage supply line 58. At this time, the transfer gate 10 and horizontal selection switch 26 are both in the OFF state. Further, in a case in which charge amplifier 41 is constituted by the CMOS inverter 42 shown in FIG. 2, vertical selection line 54 and BUS are reset to a potential of near VDD/2, and voltage VDD/2 is output at charge amplifier output OUTm.

When light is irradiated, and a carrier is generated by photodiode 2, a charge is stored in the N− region. Because an energy barrier is formed by transfer gate 10 between photodiode 2 and the FD region, the charge in light charge storage stays in the N− region.

Next, at timing t2 (refer to FIG. 4C), when a horizontal selection signal RWn is input from horizontal selection line 64 to the gate of horizontal selection switch 26, and horizontal selection switch 26 transitions to ON, output OUTm=VR (reset voltage), which is equivalent to reset level VRS from charge amplifier 41, is output (refer to FIG. 5), and, in addition, the FD region and BUS region constitute the same potential of nearly VDD/2.

Subsequently, at timing t3 (refer to FIG. 4D), gate signal TGn is input to the gate of transfer gate 10 from transfer gate control line 62 with horizontal selection switch 26 in the ON state as-is. Transfer gate 10 transitions to the ON state in accordance with gate signal TGn, the barrier under the gate disappears, and a charge stored in photodiode 2 is transferred to the FD region (charge detection capacitor 18). In this manner, the light-sensitive portion is constituted by the low-concentration reverse conductivity layer and the transfer gate, and at charge transfer time, the low-concentration reverse conductivity layer is controlled so as to be completely depleted. Furthermore, in a case in which the light-sensitive portion is constituted by a photogate and transfer gate as shown in FIG. 4E, the photogate is controlled so as to be completely depleted at charge transfer time.

A voltage change, which accords with this quantity of charge, is output as output OUTm=VS (signal voltage) from charge amplifier 41. The above operation is performed at a horizontal blanking period, and the reset voltage VR and the detected signal voltage VS are output from charge amplifier 41 in such sequence.

In this manner, in the embodiment, after the charge amplifier 41 and vertical selection line 54 are reset and at the same time the detection capacitor 18 is also reset at timing t1, the charge amplifier 41 is set to the detection mode. At timing t2, by setting the horizontal selection switch 26 to ON, and connecting the detection capacitor 18 to vertical selection line 54, the reset level of detection capacitor 18 is converted to reset voltage VR. And next, at timing t3, a charge is either injected to or transferred from the light-sensitive portion 2, to the vertical selection line 54 and converted to the signal voltage VS.

Figure 6:
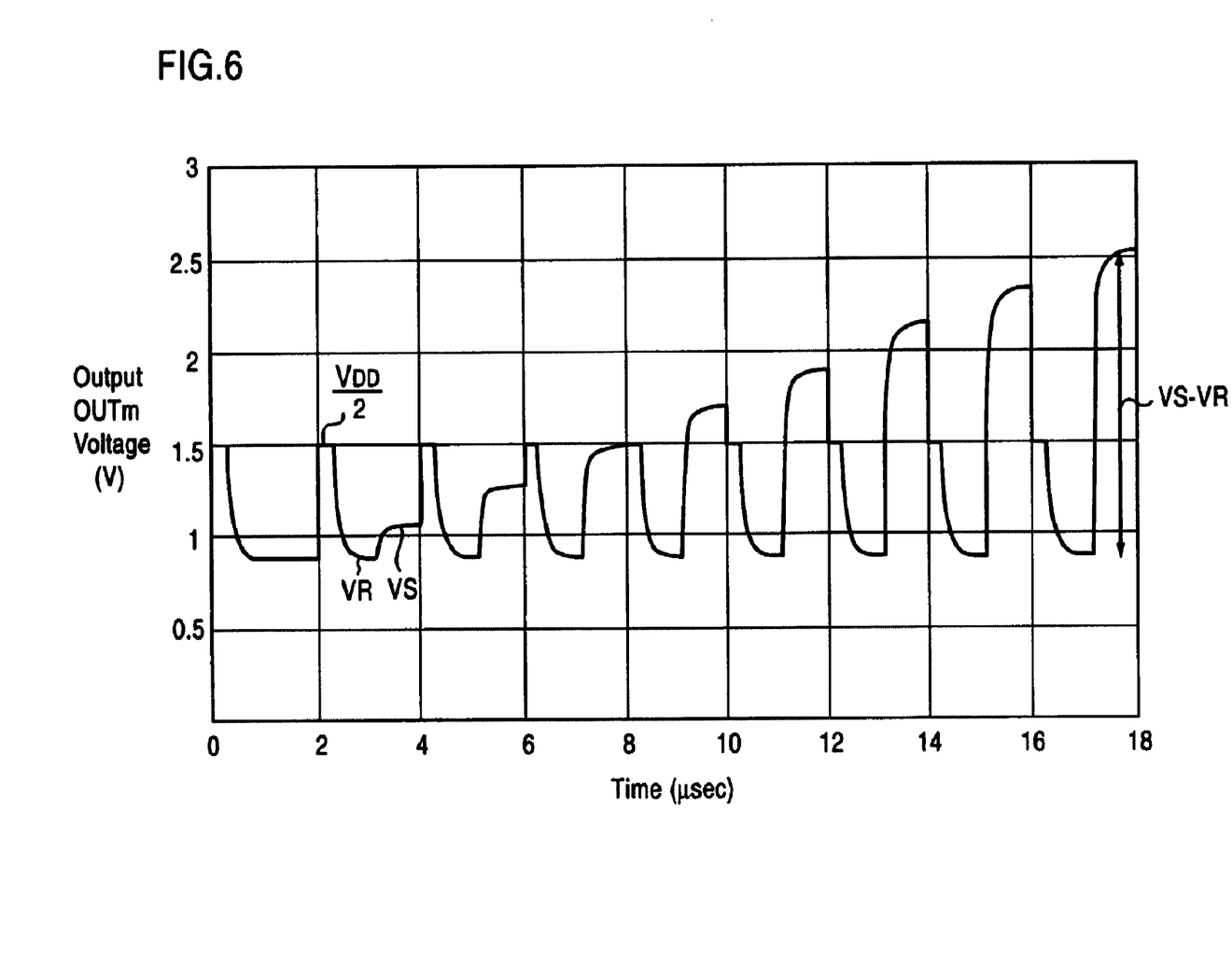
FIG. 6 is a diagram showing the results of simulation with a simplified circuit changes in output OUTm output from a charge amplifier of an XY address-type image sensor according to the first embodiment.

The results of simulation via a simplified circuit the changes in output OUTm from charge amplifier 41 are shown in FIG. 6. The horizontal axis of FIG. 6 represents time (2 $\mu$sec/div), and the vertical axis shows the output voltage of the output OUTm. FIG. 6 shows an example of a case in which a line reset signal LRST and a reset signal RST are output every 2 $\mu$sec, a quantity of light increases, and a charge to be stored in the photodiode gradually increases. Letting VDD=3V, OUTm=VDD/2=1.5V at line reset time, OUTm=VR is output by inputting a horizontal selection signal RWn, which is input immediately after line reset, the transfer gate 10 transitions to the ON state after approximately 1 $\mu$sec from line reset, and OUTm= VS is output. In this way, in the embodiment, a reset voltage VR of immediately prior to signal storage is outputted from charge amplifier 41, and thereafter, signal voltage VS is output. Furthermore, as is clear from the timing chart of FIG. 5, because charge amplifier 41 according to the embodiment is constituted so as to be connected to a power source and activated only in the prescribed period of a detection mode, wherein a reset voltage VR and a signal voltage VS are detected and output, it is possible to strive for power savings.

Output OUTm from charge amplifier 41 is input to the sample holding circuit and correlated double sampling circuit shown in FIG. 3. As shown in FIG. 5, at timing t2, a sample holding signal SH is input at the gate of sample holding switch 76 of the sample holding circuit in synchronization with the rising edge of reset voltage RSTn, transitioning switch 76 to the ON state. And at the same time, a clamping signal CLP is input at the gate of clamping switch 84 of the correlated double sampling circuit in synchronization with the falling edge of reset voltage RSTn, transitioning switch 84 to the ON state.

In this timing t2 state, OUTm=VR from the charge amplifier 41 is applied to the input terminal (IN) of the sample holding circuit. Reset voltage VR charges sample holding capacitor 78 of the sample holding circuit, and, in addition, also charges correlated double sampling capacitor 86 by way of source follower 82. Because in accordance with the ON state of clamping switch 84, the other terminal of correlated double sampling capacitor 86 is fixed at ground voltage, node N1 is charged by a voltage that is lower by the threshold voltage of source follower transistor 82 than the charging voltage (node N3 voltage) of sample holding capacitor 78.

Subsequently, at timing t3, at the point in time when the other terminal (node N2) of correlated double sampling capacitor 86 becomes floating by clamping switch 84 OFF, signal voltage VS is input to the input terminal of the sample holding circuit, and held by sample holding capacitor 78. As a result thereof, a differential signal (VS−VR), which is equivalent to the difference between the reset voltage VR and the signal voltage VS, is generated at the output side (node N2) of correlated double sampling capacitor 86. This signal is held by correlated double sampling capacitor 86, and drives output source follower-type buffer 88. Output source follower-type buffer 88 is connected to a horizontal direction output line 94 by way of multiplexing switch 92, and only the differential signal (VS−VR) which offsets the reset noise is output.

The above operation is summarized as hereinbelow. This summary will be explained by referring to FIGS. 2, 3, 4, 5. On the premise of reading out a charge that accords with a quantity of light received, charges stored in the photodiode of each cell are all read out at the stage of timing t3 (FIG. 4D).

During the horizontal blanking period of a cell, at reset timing t1, reset signal RSTn is applied, reset switch 34 conducts, and detection capacitor 18 is charged to reset voltage VRS. Specifically, as explained for the conventional example, the reset level of detection capacitor 18 constitutes the level at which kTC noise (thermal noise) is superimposed on reset voltage VRS. Further, at reset timing t1, because the feedback switch 50 of charge amplifier 41 transitions ON, the input and output of CMOS inverter 42 are both reset to an intermediate of power source voltage VDD/2. As a result thereof, the level of readout line 54 (BUS region) constitutes VDD/2 as shown in FIG. 4B.

Following the above-mentioned reset timing t1, at reset level readout timing t2, the reset level of detection capacitor 18 is held in sample holding capacitor 78 and correlated double sampling capacitor 86. That is, when the horizontal selection switch 26 transitions to ON by the horizontal selection signal RWn, the potential of the capacitor CLN of vertical selection line 54, which is connected to the input of CMOS inverter 42, is maintained at VDD/2 by an image charging operation of the CMOS inverter 42 and feedback capacitor 46 thereof, and, in addition, a potential VR that accords with reset level VRS is generated at output OUTm. That is, as shown in FIG. 5, output OUTm is reduced to reset level VR by the image charging operation of charge amplifier 41. And then, the reset level of this output OUTm is held by sample holding capacitor 78, and at the same time, a charge corresponding thereto is also held in correlated double sampling capacitor 86. That is, the reset level is held in correlated double sampling capacitor 86, and the level, at which thermal noise (kTC noise) is superimposed on the reset level, is held in node N1.

Accordingly, a quantity of charge stored in the capacitor of photodiode 2, is read out at light integral value readout timing t3. Transfer gate 10 is set to ON by gate signal TGn with horizontal selection switch 26 in the ON state as-is. As a result thereof, as shown in FIG. 4D, a charge stored in photodiode 2 flows into detection capacitor 18 and vertical selection line 54. At this time, the potential of the capacitor CLN of the vertical selection line 54, which is connected to the input of CMOS inverter 42, is maintained at VDD/2 by the image charging operation of CMOS inverter 42 and the feedback capacitor 46 thereof, and, in addition, as shown in FIG. 5, a detection level VS corresponding to a quantity of charge stored in photodiode 2 is generated at output OUTm. At this readout, the charge of photodiode 2 becomes void, constituting a completely depleted state.

By sampling and holding detection level VS read out at this output OUTm, node N1 of correlated double sampling capacitor 86 constitutes a level corresponding to detection level VS. As a result thereof, node N2, which is the counter electrode of capacitor 86, constitutes the differential potential (VS−VR) of reset level VR and detection level VS. However, this detection level VS is the level to which is added the thermal noise superimposed on the initial reset level VR. Therefore, thermal noise is eliminated by determining the differential potential thereof.

Moreover, the inside of a cell is not a constitution which is subject to the effects of the threshold voltage VT of a transistor such as a source follower circuit as with a conventional example. Therefore, the differential potential (VS−VR) constitutes a signal, which does not comprise fixed pattern noise.

In the above-mentioned operation example, the storage period of a charge corresponding to a quantity of light received in photodiode 2 constitutes a period from after a readout until the next readout. Accordingly, in a case in which it is necessary to adjust this charge storage period to an arbitrary period, the transfer gate 10 can be set to ON by applying a gate signal TGn at the appropriate time, and a charge stored in photodiode 2 can be transferred to detection capacitor 18. In accordance therewith, in detection capacitor 18, as indicated by the dotted line in FIG. 4B, detection capacitor 18 is charged to a certain level. However, because detection capacitor 18 is reset to reset level VRS at reset timing t1, there is no effect on the readout level thereafter.

In this manner, according to the embodiment, because a charge is transferred, and a signal is detected after line reset and detection capacitor reset, reset noise (kTC noise) is offset by the correlated double sampling thereafter, and in principle, it is possible to achieve the same picture quality as a CCD-type solid-state imaging device with a CMOS-based circuit constitution without generating either fixed pattern noise or kTC noise.

The present invention is not limited to the above embodiment, and various variations are possible.

For example, in the above embodiment, an example in which a CMOS converter was used as a charge amplifier was explained, but the present invention is not limited thereto, and a higher performance solid-state imaging device can also be achieved using a voltage follower, or a differential amplifier that uses an operational amplifier.

In the above embodiment, an explanation was provided using mainly the pixel in the upper left of FIG. 1 as an example, but, of course, the other pixels operate the same way. Further, transfer gates 10–16, horizontal selection switches 26–32, and various other types of switches are controlled by peripheral control circuits, such as a CMOS shift register, CMOS decoder, and the like, which are disposed on a solid-state imaging device chip.

Further, in the above embodiment, the waveband of the light incident on a light-sensitive portion is not clarified, but the present invention can be applied to both the visible light region, and the infrared light region by using a light-sensitive portion having a prescribed waveband.

Figure 9:
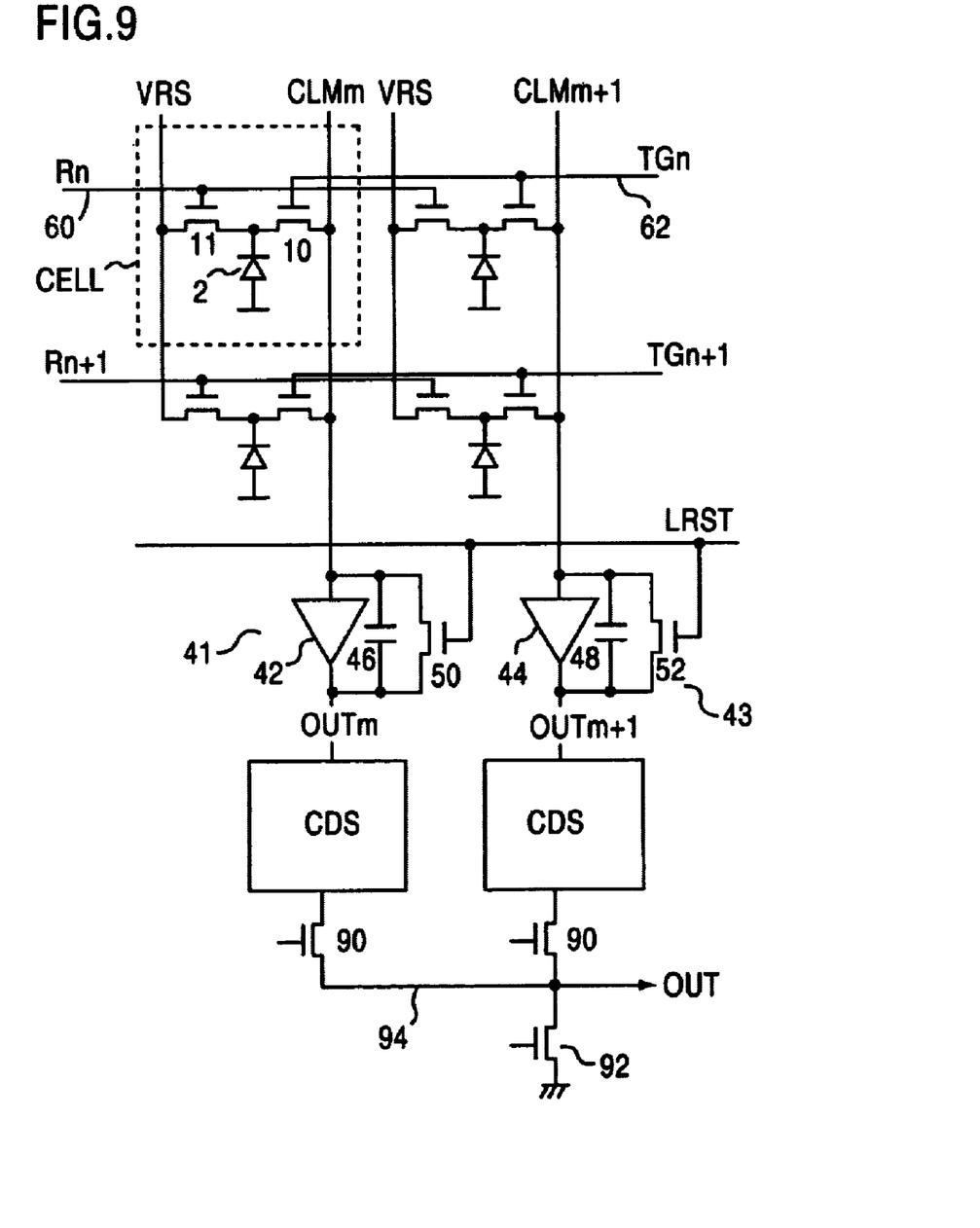
FIG. 9 is a diagram showing a circuit example of an XY address-type image sensor in a solid-state imaging device according to a second embodiment.

A solid-state imaging device according to a second embodiment is capable of removing fixed pattern noise and kTC noise (thermal noise), and, in addition, enables the number of elements of a cell, which is the pixel, to be made smaller. FIG. 9 is a diagram showing a circuit of 2×2 pixels of a solid-state imaging device in the second embodiment. A cell CELL in this example has a photodiode 2 for storing a charge corresponding to a quantity of light received, a reset gate 11, which is disposed between reset voltage VRS and photodiode 2, and a transfer gate 10, which is disposed between photodiode 2 and a vertical selection line CLM. Therefore, it is a simple constitution of 2 transistors and 1 photodiode.

And, there is provided a reset control signal line 60 for supplying a reset signal Rn in the horizontal direction, and a transfer gate control signal line 62 for supplying a gate signal TGn, and there are provided vertical selection lines CLMm, CLMm+1, which are connected to the transfer gate 10 of the respective cells in the vertical direction. Similar to the first embodiment, the vertical selection lines are connected to charge amplifiers 41, 43. The charge amplifiers 41, 43 are constituted the same as in the first embodiment, and convert a charge output from a cell CELL to a voltage. Further, charge amplifiers 41, 43 are connected to the respective sample holding and correlated double sampling CDS circuits shown in FIG. 3, and a differential voltage between a reset level and a detection level is generated as a detection signal.

FIG. 10 is a diagram showing the cross-sectional structure, and energy level changes of a cell. FIG. 10A shows the cross-sectional structure of a cell CELL. Inside a P-type substrate 200, which is biased to the ground, there is formed an N-type well region 100 biased to a power source Vdd, and inside this N-type well region 100, there is formed a P-type well region 111 biased to ground Vss. Therefore, N-type well region 100 is reverse biased, and electrically isolated relative to substrate 200.

Figure 10A:
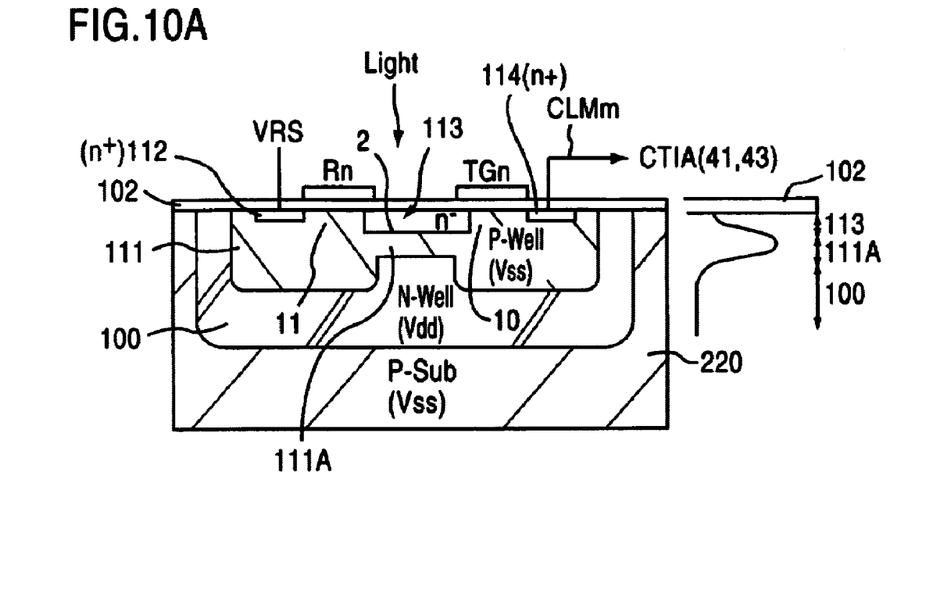
FIGS. 10A–10D are the cross-sectional structures and energy level schematics of a solid-state imaging device in the second embodiment.

Furthermore, P-type well region 111 is formed such that opposite sides are of high concentration, and are deep, and the central portion is of low concentration, and is shallow. In the deep region of the left side, there are formed an n+ region 112, which is connected to reset voltage VRS, and a reset gate electrode Rn, and in the deep region of the right side, there are formed an n+ region 114, which is connected to vertical selection line CLMm, and a transfer gate electrode TGn. And then, in the shallow P-type well region 111A in the central portion, a low-concentration n region 113 is formed. This low-concentration n region 113, and shallow P-type well region 111A form a photodiode PN junction.

On the right side of the cross-sectional view of FIG. 10A, as indicated by the energy level in the depth direction of directly below shallow P-type well region 111A in the center, only a low barrier intervenes between low-concentration n region 113 and N-type well region 100 in accordance with shallow P-type region 111A. Because P-type well region 111A directly below photodiode cathode region 113 is of a low concentration, and thin, and because N-type well region 100 is biased by power source Vdd, and P-type well region 111 is biased by ground Vss, P-type well region 111A is depleted, and constitutes a low energy level compared to P-type well region 111, which is adjacent to cathode region 113 in the horizontal direction.

Figure 10B:
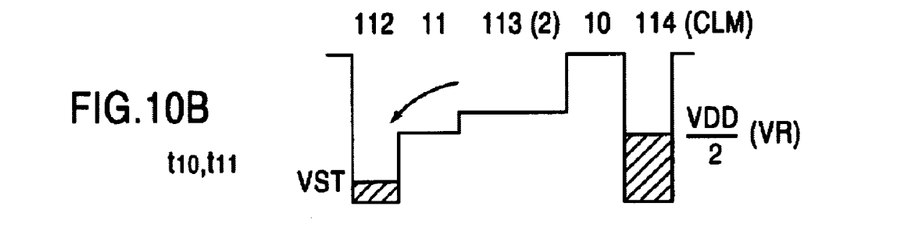
Figure 10C:
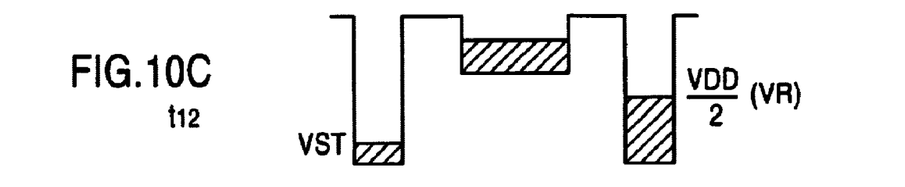
Figure 10D:
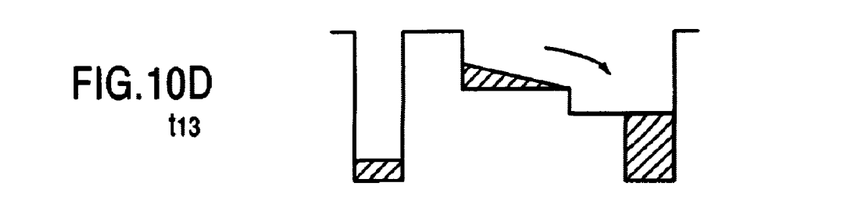
Figure 11:
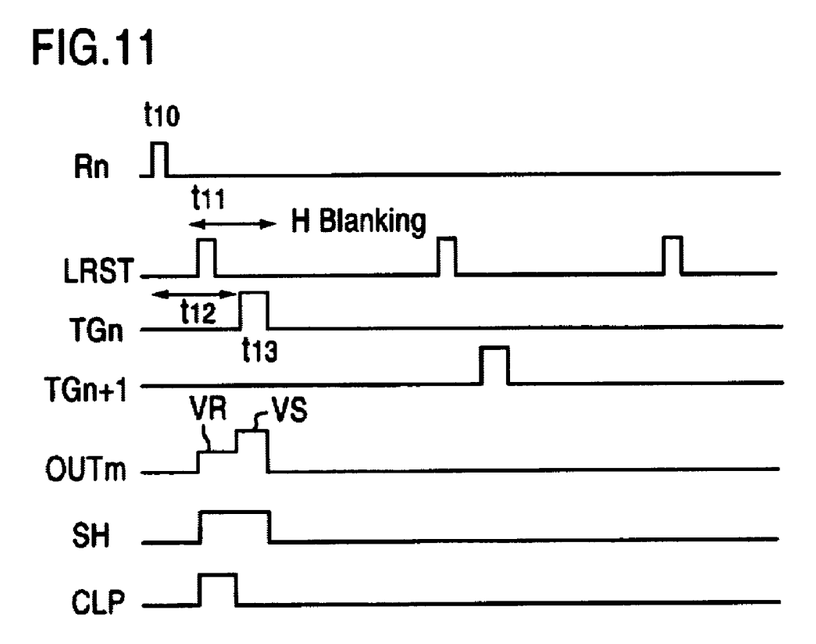
FIG. 11 is a timing chart showing the driving of a cell.
Figure 12A:
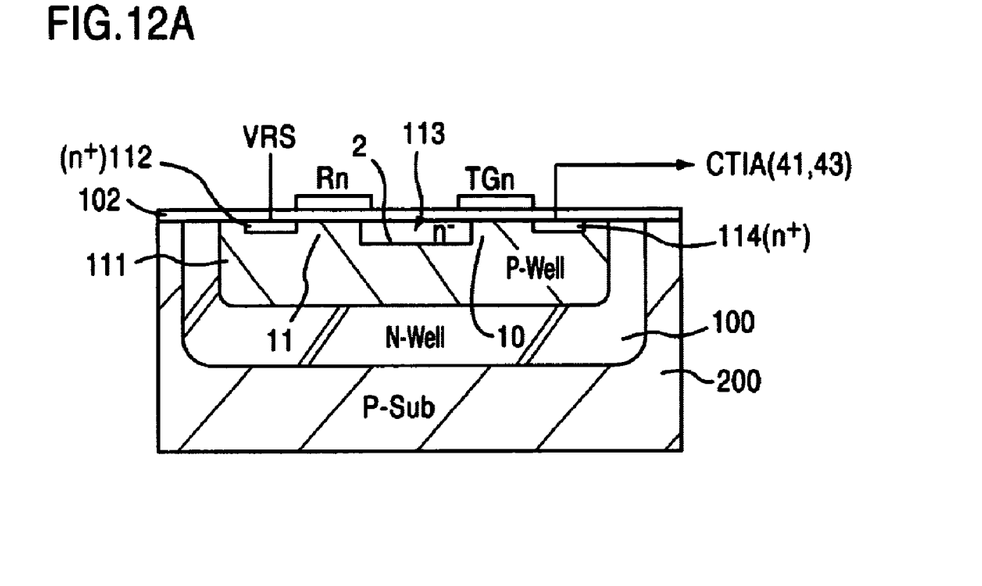
FIGS. 12A–12D are diagrams showing a variation of the second embodiment.
Figure 12B:
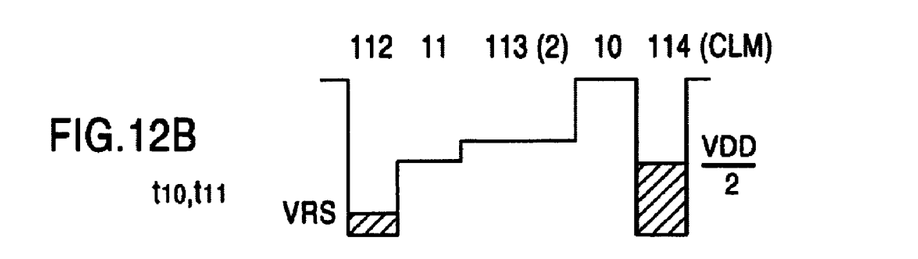
Figure 12C:
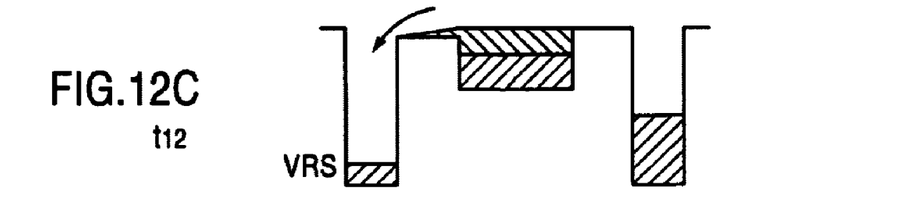
Figure 12D:
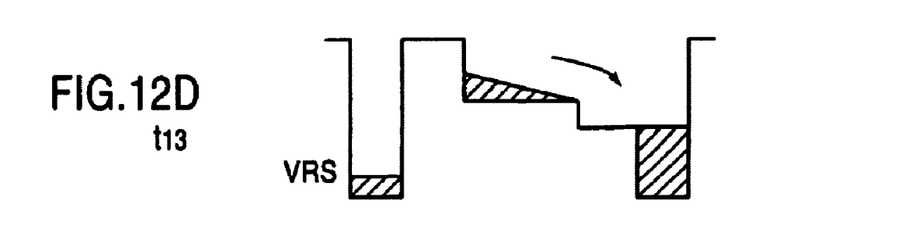

FIGS. 10B, 10C, 10D, respectively, show energy levels at reset timing t10 and t11, at photoelectrically-converted charge integral timing t12, and at stored charge readout timing t13. Further, FIG. 11 is a timing chart indicating the driving of a cell. A cell readout operation will be explained by referring to these figures.

At reset timing t10, a reset pulse Rn is supplied, reset gate 11 transitions ON, and low-concentration n region 113, which is the cathode region constituting the photodiode, is connected to reset voltage VRS. In accordance therewith, the low-concentration n region 113 of photodiode 2 is completely depleted. In this completely depleted state, the energy level of low-concentration n region 113 constitutes a fixed level determined by the quantity of doped impurities and depth, and thermal noise is not contained in the energy level thereof. When reset pulse Rn disappears, as in FIG. 10C, the barrier of reset gate 11 increases, and the storing of a photoelectrically-converted charge in depleted low-concentration n region 113 begins.

Conversely, separate from reset pulse Rn, at timing t11 immediately prior to readout timing t13, a line reset pulse LRST is applied to line reset switches 50, 52 of charge amplifiers 41, 43, the input-output terminals of inverters 42, 44 are short-circuited, and vertical selection line CLM is reset to VDD/2. That is, n region 114, which is the drain region of transfer gate 10, is reset to power source intermediate level VDD/2 as reset level VR. Thermal noise is contained in this reset level VR (VDD/2).

By applying line reset signal LRST, the output OUTm of charge amplifier 41 constitutes reset level VR. At that time, a sampling-holding pulse SH is applied, the reset level VR is sampled and held, and, in addition, correlated double sampling capacitor 86 is charged to a level corresponding to the reset level VR.

A photoelectrically-converted charges (since it is n type, an electron) are stored in photodiode low-concentration n region 113 from reset pulse Rn of reset timing t10. In a case in which an excess of light is incident on a pixel at that time, the charges crosse over low barrier 111A in the depth direction of the substrate, the charge flow into N-type well region 100, and the blooming phenomenon, by which charges spill over into an adjacent pixel, is checked. When the above-mentioned integral timing t12 is over, a gate control pulse TGn is applied, and the barrier of transfer gate 10 is lowered, as shown in FIG. 10D. In accordance therewith, the charge stored in low-concentration n region 113 flows into n region 114. Pursuant thereto, the level of vertical selection line CLMm changes to a rising direction (direction in which potential drops), the level of vertical selection line CLMm is constantly maintained at reset level VDD/2 by an image charging operation of charge amplifier 41, and the potential of output OUTm rises to detection level VS. This detection level is sampled and held, and a differential voltage VS–VR is generated at node N2 of correlated double sampling capacitor 86.

In this case, because initial thermal noise is also superimposed on detection level VS, thermal noise is removed from the differential voltage VS–VR. Naturally, fixed pattern noise is not contained in differential voltage VS–VR.

As a characteristic of the second embodiment, there provides a reset gate 11 for removing a charge stored in the well of photodiode 2. Moreover, when this reset gate 11 is ON, the electron well of photodiode 2 is completely depleted, and is reset to an absolute level determined by the doping concentration and depth of low-concentration n region 113. Therefore, thermal noise is not contained therein. And by controlling the timing at which reset pulse Rn is applied, it is possible to achieve either an electron shutter function, or a exposure control function.

FIG. 12 is a diagram showing a variation of the second embodiment. As shown in the cross-sectional view of FIG. 12A, the P-type well region 111 of the central portion is formed deeply, and a low-concentration n region 113, which forms a photodiode 2, is formed therein. Therefore, there is no blooming suppressing function that uses a shallow P-type well region 111A as shown in FIG. 10A. In place thereof, in the example of FIG. 12, by applying a low potential reset pulse Rn to reset gate 11 and continuing a quasi-conductive state without setting reset ate 11 completely OFF at integral timing t12, which stores photoelectrically-converted electrons, when an excess of light is received at integral timing t12, electrons leaked to the n region 112 side to which reset voltage VRS is applied. In accordance therewith, the blooming phenomenon, whereby a charge resulting from excess light spills over to an adjacent pixel, is prevented from occurring.

Figure 13:
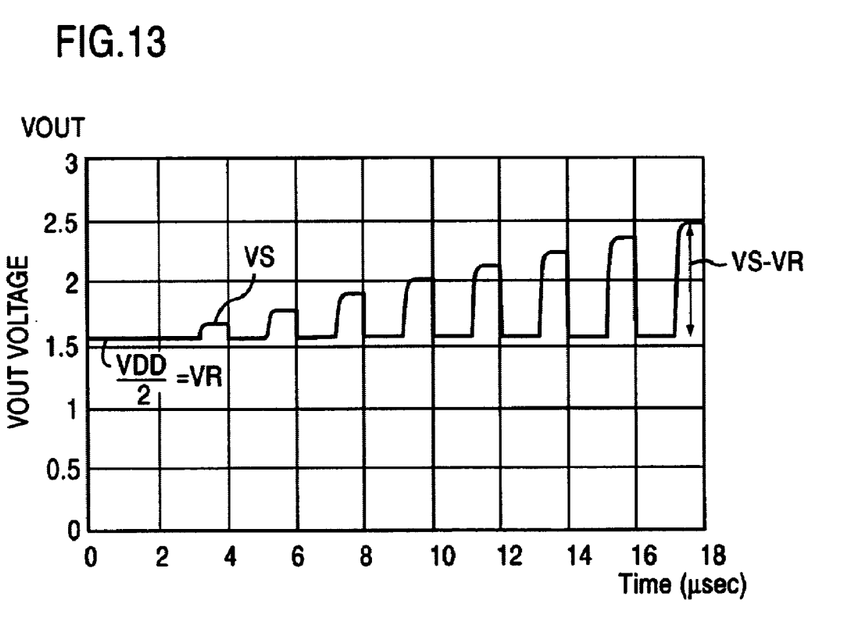
FIG. 13 is a diagram showing simulation results of the second embodiment.

FIG. 13 is a diagram showing simulation results of a case in which a cell circuit of the second embodiment is utilized. As also shown in FIG. 11, output VOUT is reset to nearly VDD/2 (VR) by a reset operation, and thereafter, increases to the detection level VS by setting the transfer gate to ON. Therefore, in the second embodiment, because the output VOUT of a charge amplifier only rises from reset level VR to detection level VS, the upper half of the power source VDD (=3V) range of CMOS inverters 42, 44 is mainly used. By contrast thereto, in the first embodiment, as shown in FIG. 6, output VOUT drops one time to reset level VR from VDD/2, and rises to detection level VS. That is, the dynamic range relative to differential voltage (VS–VR) is broader in the first embodiment.

Therefore, in the second embodiment, the dimension ratio of the P-channel transistor and the N-channel transistor of a CMOS inverter is changed, so that the operating point is set lower than VDD/2. In accordance therewith, it is possible to make reset level VR lower than VDD/2, enabling the realization of a broad dynamic range like that in the first embodiment.

In the above second embodiment as well, a cell photodiode can be replaced by a photogate as shown in FIG. 4E. In this case, too, the electron well directly below the photogate gate oxide layer is depleted by making the reset gate conductive, and reset to an absolute level, which is determined by concentration conditions and so forth.

As described hereinabove, according to the present invention, it is possible to achieve a solid-state imaging device, which has a simple pixel constitution, and a wide numerical aperture, and which reduces fixed pattern noise (FPN) and thermal noise (kTC noise).

What is claimed is:

1. A solid-state imaging device comprising:
a plurality of pixels, each pixel including a light-sensitive portion for photoelectrically converting incident light, a transfer gate for transferring a charge stored in said light-sensitive portion, a resettable detection capacitor for storing said charge transferred from said transfer gate, and a selection switch for outputting a charge of said detection capacitor according to a selection signal;
a charge amplifier for converting to a voltage a charge of said detection capacitor, which is outputted from the pixels; and
a correlated double sampling circuit for obtaining a voltage difference between a reset voltage and a detected voltage converted by the charge amplifier,
wherein said reset voltage is converted from a charge of the detection capacitor when being reset at reset timing, and said detected voltage is converted from a charge of the detection capacitor when a charge stored in the light-sensitive portion is transferred to the reset detection capacitor, following to the reset timing.

2. The solid-state imaging device according to claim 1, wherein said charge amplifier is a capacitive feedback-type impedance conversion circuit.

3. The solid-state imaging device according to claim 1, wherein said charge amplifier converts to the reset voltage a reset level of said detection capacitor by said selection switch transitioning to ON, and said detection capacitor being connected to an input of said charge amplifier, and thereafter, converts to the detected voltage said charge of the detection capacitor, when the charge stored in the light-sensitive portion is transferred to said detection capacitor by said transfer gate transitioning to ON.

4. A solid-state imaging device comprising:
a plurality of pixels, each pixel including a light-sensitive portion for photoelectrically converting incident light and storing a charge, a reset gate, connected to said light-sensitive portion, for depleting said light-sensitive portion by becoming conductive in response to a reset signal, and a transfer gate, connected to said light-sensitive portion, for outputting a charge, which is stored in said light-sensitive portion after being depleted, by becoming conductive in a response to a selection signal;
a charge amplifier, connected to said transfer gate of said pixel, for converting said outputted charge to a voltage; and
a corrected double sampling circuit for sampling and holding an output voltage of said charge amplifier,
wherein a differential voltage between a reset level which said charge amplifier outputs when being reset, and a detection level, which said charge amplifier outputs in accordance with the charge outputted from said pixel, is outputted from said correlated double sampling circuit.

5. The solid-state imaging device according to claim 4 wherein said light-sensitive portion is formed by a second conductive-type cathode region, which is formed at a prescribed depth inside a first conductive-type semiconductor region, and
said reset gate is a MOS-type transistor, which is formed by said cathode region, a reset gate electrode formed on said first conductive-type semiconductor region, and a second conductive-type drain region, which is formed inside said first conductive-type semiconductor region, and which has a higher concentration than said cathode region.

6. The solid-state imaging device according to claim 5, wherein said transfer gate is a MOS-type transistor, which is formed by said cathode region, a transfer gate electrode formed on said first conductive-type semiconductor region, and a second conductive-type output region, which is formed inside said first conductive-type semiconductor region, and which is connected to an input of said charge amplifier.

7. The solid-state imaging device according to claim 5, wherein said cathode region is depleted when said light-sensitive portion is reset.

8. The solid-state imaging device according to claim 7, wherein said first conductive-type semiconductor region is a well region formed inside a second conductive-type region, and a region directly beneath said cathode region of said well region is controlled to be depleted.

9. The solid-state imaging device according to claim 4, wherein said reset gate maintains a quasi-conductive state while said light-sensitive portion stores a photoelectrically-converted charge.

* * * * *